United States Patent [19]
Lewarchik et al.

[11] Patent Number: 4,504,374
[45] Date of Patent: Mar. 12, 1985

[54] ULTRAVIOLET CURED COATING METHOD TO PROVIDE STONE CHIP RESISTANCE

[75] Inventors: Ronald J. Lewarchik, Arlington Hgts.; Edward J. Murphy, Mt. Prospect; Elaine C. Beeks, Rolling Meadows, all of Ill.

[73] Assignee: DeSoto, Inc., Des Plaines, Ill.

[21] Appl. No.: 473,547

[22] Filed: Mar. 9, 1983

[51] Int. Cl.[3] ........................ C25D 13/08; B05D 3/06; C08F 2/48

[52] U.S. Cl. ............................ 204/181 C; 204/181 T; 204/159.23; 427/410; 427/386; 427/54.1

[58] Field of Search ............ 204/181 E, 181 T, 18 C, 204/159.23; 427/409, 407.1, 421, 386, 410, 54.1, 44

[56] References Cited

U.S. PATENT DOCUMENTS

| | | | |
|---|---|---|---|
| 4,035,274 | 7/1977 | McGinniss | 204/181 E |
| 4,105,518 | 8/1978 | McGinniss | 204/181 E |
| 4,166,017 | 8/1979 | McGinniss | 204/181 E |
| 4,254,168 | 3/1981 | Monson | 427/409 |
| 4,259,163 | 3/1981 | Suzuki et al. | 204/181 T |
| 4,318,766 | 3/1982 | Smith | 204/159.23 |

*Primary Examiner*—John F. Niebling
*Assistant Examiner*—B. J. Boggs, Jr.
*Attorney, Agent, or Firm*—Dressler, Goldsmith, Shore, Sutker & Milnamow, Ltd.

[57] ABSTRACT

A method of providing a stone chip-resistant finish to the undersurface of an automobile is disclosed in which the undersurface is coated with a cationically initiated liquid mixture of cationically curable polyepoxide, polyhydric alcohol, and a photoinitiator for an ultraviolet-activated cationic cure. The liquid mixture is applied at a resin solids content of at least about 50% and in a thickness to provide a cured coating of at least 2 mils thick, and the wet coating is cured by exposing it to ultraviolet light. The automobile undersurface is desirably primed with a cross-linked amine-functional polymer primer, and the coating includes from 1% to 8% of a finely divided silica which prevents running but does not interfere with the ultraviolet cure.

16 Claims, No Drawings

ULTRAVIOLET CURED COATING METHOD TO PROVIDE STONE CHIP RESISTANCE

DESCRIPTION

1. Technical Field

This invention relates to the coating of the lower portions of automobile bodies to provide corrosion protection by minimizing the chipping of the protective coating by stones which are hurled against the lower portion of the vehicle when it is operated.

2. Background Art

It is of obvious importance to protect the metal surfaces of an automobile body from corrosion, and these surfaces are painted for this purpose. However, the spinning wheels of the vehicle hurl stones and pebbles against the lower surfaces of the vehicle, and this causes the paint to chip away and expose the bare metal, which then corrodes.

For several years, the metal lower surfaces (normally phosphate-treated steel) have been prime coated by cathodic electrocoating of acid-solubilized amine-functional polymer, and the primer is baked to cure the same. This forms a prime coating of cross-linked amine-functional polymer which has a thickness of about 0.6 mil or more. This primer is then overcoated with a polyvinyl chloride plastisol to provide a resilient protective layer. Airless spray is normally needed for application of the plastisol and a plastisol coating of about 15 to 20 mils thickness is needed for adequate stone chip resistance. These thick coatings tend to sag when applied and are expensive because so much material is needed. They also offer poor compatibility with the high solids topcoats and also with some of the lower solids topcoats now used to paint the vehicle.

Lately, in place of the plastisol protective coating, there has been applied a single package polyurethane coating which usually requires hot spray application and a thickness of 6–10 mils for stone chip resistance. The coatings are expensive and offer poor compatibility with many of the lower solids topcoats now used to paint the vehicle.

As will be evident, a stone chip-resistant finish is hard to provide, and present efforts to solve the problem are difficult and expensive.

DISCLOSURE OF INVENTION

In accordance with this invention, there is applied to the undersurface of an automobile (the lower visible surfaces) which is preferably primed with a cross-linked amine-functional polymer primer, a cationically initiated liquid mixture of a cationically curable polyepoxide, a polyhydric alcohol and/or water, and a photoinitiator and/or photosensitizer for an ultraviolet-activated cationic cure. This cationically initiated, ultraviolet-curable coating is applied at a resin solids content of at least about 50% and in a thickness to provide a coating at least about 2 mils thick. The wet coating is then cured by exposure to ultraviolet light.

It is stressed that these cationically initiated, ultraviolet-curable coatings are of known type, as shown in B. H. Smith U.S. Pat. No. 4,318,766, but it was not known that they are unusual in that they bond strongly to the cathodically electroprimed surface. It was also not appreciated that relatively thick layers of these coatings, when cured by ultraviolet light, would possess great impact resistance so as to avoid chipping when impacted with pebbles and stones. The cured coatings of this invention are also advantageous because they are compatible with topcoats of various types, including the high solids topcoats and many of the low solids topcoats now being used.

It is preferred that the undersurface of the automobile be protected by a primer, as has been discussed. However, this invention is applicable even when the automobile undersurface is constituted by base metal or be a previously painted surface.

It is desired to point out that the coatings of this invention must be applied at a thickness of at least about 2 mils (and up to about 7 mils) in order to provide the desired chip resistance. Application is preferably by air or electrostatic spray, and this is an advantage over the prior art. The convenience of air or electrostatic spray application is enabled herein by employing a viscosity enabling such spray together with a thixotropic agent which does not unduly absorb ultraviolet light.

Ultraviolet-cured coatings are difficult to handle when applied at the thicknesses noted because they tend to drip and run, especially when thinned to air or electrostatic spray viscosity. It is found, in this invention, that the presence of from 1% to 8%, preferably from 1.5% to 6%, of finely divided silica provides resistance to dripping and running in the thicknesses needed without preventing air spray, and without unduly disturbing the effectiveness of the ultraviolet cure. Many pigments and fillers absorb ultraviolet light, and thus interfere with the desired ultraviolet cure to at least some extent.

Also, prior coatings are frequently pigmented, and it is preferred herein to employ the finely divided silica as substantially the only finely divided material within the coatings in order to maximize the resin content of the coatings and thereby maximize stone chip resistance.

The cross-linked amine-functional polymer primers of the invention are well known, as a class, and are normally deposited by cathodic electrodeposition. These primers and their electrodeposition at the cathode are illustrated in U.S. Pat. Nos. 3,799,854 and 4,031,050. As is known, these primers are constituted by amine-functional solvent-soluble polymers which are dispersed in water with the aid of an acid and are usually cured with an extraneous curing agent which may be an aminoplast resin, such as hexamethoxymethyl melamine, a phenoplast resin, such as a phenol-formaldehyde A-stage resol, or a blocked polyisocyanate, such as a butanol-blocked toluene diisocyanate. These blocked polyisocyanates are employed in most of the commercial cathodic electropriming tanks now in operation. In some instances, the reactive group in the curing agent is incorporated into the amine-functional resin so as to eliminate the need for a separate curing agent. In any event, the cathodically electroprimed and cured coated surface contains a cross-linked amine-functional polymer which provides good corrosion resistance, but these cured polymers lack stone chip resistance, and the surface of these primers is hard to adhere to, especially when isocyanate functionality is relied upon for cure. It is stressed that these electroprimed surfaces create a considerable problem because of their poor adhesion to coatings deposited thereupon.

The capacity of the coatings of this invention to provide good stone chip resistance in the thicknesses specified herein, and especially to do so when coated upon cathodically electroprimed surfaces, is thus unexpected and constitutes a practical solution to an industrial problems which has plagued the automotive industry for a long period of time. It will be noted that the thicknesses recited are thicker than the cationically initiated ultraviolet curable coatings normally employed, and thinner than resilient chip resistant coatings are normally required to be, so the use of coatings thinner than 7 mils is also unexpected.

The polyepoxides which are cationically curable and used in this invention constitute a known class of materials. Those based on hydrogenated bisphenol, such as Eponex DRH 1511 and DRH 1510, are preferred, but cycloaliphatic liquid epoxy resins, such as Bakelite ERL 4221 and ERL 4289, are quite good. Hydantoin-based polyepoxides are also useful and available from Ciba-Geigy. These may be used alone, or in combination with glycidyl ethers of a bisphenol, such as Epon 828, 1001, and Araldite 6010. These commercial products are all of known composition. Polyepoxides based on novalac resins and epoxidized polybutadienes are also useful, especially in admixture with the hydrogenated bisphenol-based polyepoxides and the cycloaliphatic polyepoxides. Even monoepoxides may be present, such as Cardura E from Shell Chemical Company which is a glycidyl ester of neodecanoic acid. Suitable mixtures will be illustrated in the examples.

The polyhydric alcohol component of the coatings used in this invention is subject to wide variation so long as basic substituents and contaminants are absent. Polyhydric alcohols which are polyethers, such as $C_2$–$C_4$ alkylene oxide adducts of polyhydric alcohols, such as ethylene glycol, butylene, glycerin, trimethylol propane and pentaerythritol, are all useful. The commercial products Pluracol TP 440 and P 1010, polypropylene glycol 425, Dow 565 and 8025, all of which are known compositions, are fully suited for use in this invention. Even resinous polyols may be used, such as an hydroxy-functional polyester of glycerin and phthalic anhydride, or a polyacrylate containing 5% to 25% by weight of copolymerized hydroxyethyl acrylate, and the like. Compatibility with the polyepoxide is the only factor of interest, so polyol selection is subject to wide variation. It is preferred that these polyols provide some primary hydroxy functionality, as is provided by adducting with ethylene oxide. Water may replace the polyhydric alcohol in whole or in part.

Photoinitiators useful for the ultraviolet-activated cationic cure of appropriate polyepoxides in admixture with polyhydric alcohols are known. Diaryliodonium salts, such as the 3M product FC 509 are particularly contemplated, and these are normally used in combination with a ketonic photosensitizer, such as benzophenone. Other photosensitizers are illustrated by chlorothioxanthone, isopropylthioxanthone, xanthone, and the like. Benzophenone is preferred because of its greater solubility and lower cost.

This invention is not limited to the use of iodonium salts since triaryl sulfonium salts, such as the 3M product FC 508, are also useful. These sulfonium salts do not require ketonic photosensitizer.

The organic solvents which are used are selected to be relatively fast evaporating. The acetate esters are particularly preferred, such as n-butyl acetate which has a distillation range of 248° F. to 262° F. For comparative purposes this solvent is assigned an evaporation rating of 1.0. Slow evaporating solvents, such as alcohols and ketones having evaporation rates below 0.5 (they take twice as long to evaporate at room temperature) are preferably avoided, or used in small amount to promote flow. Thus, the organic solvent medium which is used desirably has an evaporation rating of 0.8 or higher.

The invention is illustrated in the following examples in which all parts are by weight.

EXAMPLE NO. 1

| Component | Supplier | Parts by Wt. |
|---|---|---|
| Eponex DRH 1511 | Shell | [illegible] |
| Epon 828 | Shell | 40 |
| Pluracol TP 440 | Wyandotte | [illegible] |
| Cab-O-Sil M5 | Cabot | [illegible] |
| FC 509 | 3M | [illegible] |
| Quantacure ITX | Aceto Chemical | |
| Butyl Acetate | Commercial Solvents | [illegible] |

EXAMPLE NO. 2

| Component | Supplier | Parts by Wt. |
|---|---|---|
| Eponex DRH 1511 | Shell | [illegible] |
| Pluracol TP 440 | Wyandotte | [illegible] |
| Cab-O-Sil M5 | Cabot | [illegible] |
| FC 509 | 3M | [illegible] |
| Benzophenone | Aldrich | [illegible] |
| Butyl Acetate | Commercial Solvents | [illegible] |

EXAMPLE NO. 3

| Component | Supplier | Parts by Wt. |
|---|---|---|
| Eponex DRH 1511 | Shell | [illegible] |
| Diol XD8025 | Dow | 5 |
| Cab-O-Sil M5 | Cabot | [illegible] |
| FC 509 | 3M | [illegible] |
| Quantacure ITX | Aceto | |
| Butyl Acetate | Commercial Solvents | [illegible] |

EXAMPLE NO. 4

| Component | Supplier | Parts by Wt. |
|---|---|---|
| Epoxide ERL 4221 | Union Carbide | [illegible] |
| Diethylene glycol | Commercial Solvents | [illegible] |
| Cab-O-Sil M5 | Cabot | [illegible] |
| FC 508 | 3M | [illegible] |
| Butyl Acetate | Commercial Solvents | [illegible] |

EXAMPLE NO. 5

| Component | Supplier | Parts by Wt. |
|---|---|---|
| Eponex DRH 1511 | Shell | 40 |
| Epoxide ERL 4221 | Union Carbide | 40 |
| Pluracol TP 440 | Wyandotte | [illegible] |
| Cab-O-Sil M5 | Cabot | [illegible] |
| FC 508 | 3M | [illegible] |
| Butyl Acetate | Commercial Solvents | [illegible] |

EXAMPLE NO. 6

| Component | Supplier | Parts by Wt. |
|---|---|---|
| Eponex ERL 1511 | Shell | [illegible] |
| Epoxide ERL 4289 | Union Carbide | 0 |
| Pluracol TP 440 | Wyandotte | 0 |
| FC 509 | 3M | [illegible] |
| Xanthone | Aceto | |
| Cab-O-Sil M5 | Cabot | [illegible] |

-continued

| Component | Supplier | Parts by Wt. |
|---|---|---|
| Butyl Acetate | Commercial Solvents | 40 |

EXAMPLE NO. 7

| Component | Supplier | Parts by Wt. |
|---|---|---|
| Eponex DRH 1511 | Shell | 90 |
| Polyol PCP 0300 | Union Carbide | 10 |
| Cab-O-Sil M5 | Cabot | 3 |
| FC 509 | 3M | 3 |
| Benzophenone | Aldrich | 3 |
| Butyl Acetate | Commercial Solvents | 33 |

EXAMPLE NO. 8

| Component | Supplier | Parts by Wt. |
|---|---|---|
| Epoxide ERL 4221 | Union Carbide | 80 |
| *Acrylic Copolymer | | 29 |
| Cab-O-Sil M5 | Cabot | 2 |
| FC 508 | 3M | 4 |
| Butyl Acetate | Commercial Solvents | 24 |

*60 parts of butyl acrylate, 36 parts of methyl methacrylate, 3 parts of hydroxyethyl acrylate, and 1 part of acrylic acid are polymerized in a 69% solids solution in butyl acetate to provide a solvent soluble, hydroxy functional acrylic copolymer.

In all of the above examples the vehicle components and the Cab-O-Sil finely divided silica are blended by means of a high speed Cowles type disperser (sand milling may also be used) to provide a uniform dispersion. Photoinitiators and solvent are then added with mild agitation until the example coating mixtures are homogeneous. The resulting mixtures have #2 Zahn cup viscosities of 25 to 45 seconds at room temperature. When sprayed to a thickness of 3 to 7 mils on a vertical surface, they do not run or sag. After about 2 minutes sufficient solvent has evaporated at room temperature to permit the coatings to be cured with ultraviolet light.

Following the above procedure on metal which has been primed with a commercial cathodically deposited electroprimer cured with blocked organic polyisocyanate, as described in the patents noted previously, excellent stone chip resistance is obtained. These ultraviolet-cured coatings are overcoated in conventional fashion prior to testing for stone chip resistance.

What is claimed is:

1. A method of providing a stone chip-resistant finish to the undersurface of an automobile comprising applying to said automobile undersurface a cationically initiated liquid mixture of cationically curable polyepoxide, polyhydric alcohol and/or water, and a photoinitiator and/or photosensitizer for an ultraviolet-activated cure, said liquid mixture being applied at a resin solids content of at least about 50% and in a thickness to provide a cured coating at least about 2 mils thick, and curing the wet coating by exposing the same to ultraviolet light.

2. A method as recited in claim 1 in which said automobile undersurface is primed.

3. A method as recited in claim 1 in which said cationically initiated liquid mixture contains from 1% to 8% of a finely divided silica.

4. A method as recited in claim 3 in which said cationically initiated liquid mixture has a viscosity suitable for air or electrostatic spray and is applied by air or electrostatic spray.

5. A method as recited in claim 1 in which said liquid mixture is applied in a thickness to provide a coating up to about 7 mils thick.

6. A method as recited in claim 4 in which said liquid mixture is applied at a resin solids content of at least about 75% and in a thickness to provide a coating having a thickness of from 3 to 6 mils and contains from 1.5% to 6% of finely divided silica.

7. A method as recited in claim 6 in which said finely divided silica is substantially the only finely divided material in said liquid mixture.

8. A method of providing a stone chip-resistant finish to the undersurface of an automobile comprising applying to an automobile undersurface primed with a cross-linked amine-functional polymer primer, a cationically curable polyepoxide, polyhydric alcohol and/or water, and a photoinitiator and/or photosensitizer for an ultraviolet-activated cationic cure, said liquid mixture being applied at a resin solids content of at least about 50% and in a thickness to provide a cured coating of at least about 2 mils thick, and curing the wet coating by exposing the same to ultraviolet light.

9. A method as recited in claim 8 in which said cross-linked amine-functional polymer primer is deposited from aqueous dispersion by cathodic electrodeposition in combination with a curing agent and is baked to cure the same.

10. A method as recited in claim 9 in which said curing agent is an organic polyisocyanate.

11. A method as recited in claim 9 in which said curing agent is an aminoplast resin.

12. A method as recited in claim 9 in which said liquid mixture is applied to a thickness to provide a coating up to about 7 mils thick.

13. A method as recited in claim 9 in which said cationically curable polyepoxide is used in admixture with a polyhydric alcohol.

14. A method as recited in claim 13 in which said cationically curable polyepoxide comprises cycloaliphatic polyepoxide.

15. A method as recited in claim 14 in which said cycloaliphatic polyepoxide is used in combination with a diglycidyl ether of a bisphenol.

16. A method as recited in claim 4 in which said liquid mixture contains an organic solvent medium having an evaporation rating of 0.8 or higher.

* * * * *